United States Patent [19]

Callison

[11] Patent Number: 4,880,912

[45] Date of Patent: Nov. 14, 1989

[54] DISPERSION AND NEUTRALIZATION OF ACID CASEIN

[75] Inventor: Oscar H. Callison, Pickerington, Ohio

[73] Assignee: Abbott Laboratories, Abbott Park, Ill.

[21] Appl. No.: 42,394

[22] Filed: Apr. 24, 1987

[51] Int. Cl.[4] .................................................. C07G 7/00
[52] U.S. Cl. ..................................................... 530/361
[58] Field of Search ................................. 530/360, 361

[56] References Cited

U.S. PATENT DOCUMENTS 4,055,555 10/1977 Badertscher et al. ................ 530/361
4,209,544 6/1980 Zavagli et al. ....................... 530/361

Primary Examiner—Morton Foelak
Assistant Examiner—Nathan M. Nutter
Attorney, Agent, or Firm—Donald O. Nickey; Edward H. Gorman; Martin L. Katz

[57] ABSTRACT

An expedited process for the dispersion and neutralization of acid caseins in the manufacture of liquid caseinate that drastically reduces time and cost variables and allows for in-house production of caseinate. The process comprises the initial addition of a solubilizing agent (i.e. citrate) to an aqueous solution with a temperature of about 120° F. to about 165° F. prior to the addition of casein and a neutralizing agent. This process achieves a pH-perfect, soluble caseinate product in the form of a ready-to-use liquid or powdered caseinate.

15 Claims, No Drawings

DISPERSION AND NEUTRALIZATION OF ACID CASEIN

FIELD OF THE INVENTION

This invention relates to an improved process for the dispersion and neutralization of acid caseins in the manufacture of liquid and powdered caseinate. More particularly, the present invention relates to a process of preparing caseinate from acid caseins by the addition of alkali metal citrates, alkaline earth metal citrates, or mixtures thereof, to the water prior to the addition of the acid casein.

BACKGROUND OF THE INVENTION

Casein, the principal protein in milk, can be isolated in various forms fairly easily by insolubilization.

This invention is concerned only with acid casein. The expression "acid casein" is used in its broad sense and covers both traditional acid casein directly obtained by acidifying milk, and acid caseins obtained indirectly, such as for example a re-acidified rennet casein. Acid casein is readily available as a commercial product.

There is interest in solubilizing acid caseins in water without any major difficulties, and in converting acid caseins into a form in which they can be easily stored and transported, i.e., into powder form. Prior to this invention, the redissolution of powdered acid casein in an aqueous medium has required many precautions.

U.S. Pat. No. 4,055,555 to Badertscher et al. teaches that powdered sodium caseinate or a homogeneous solution of caseinate is prepared by providing an aqueous medium which may be pure water or an aqueous solution containing various ingredients, such as salts, sugars, colorants, flavorings, soluble proteins, especially lactalbumin (for example an aqueous medium of whey type), etc. The acid casein is added to the aqueous medium and allowed to age. After ageing, the solubilizing agent is added to provide the desired suspension. If a powder is desired the suspension is dried.

The Badertscher patent teaches an ageing time of at least 10 minutes and preferably 30 minutes, and shows a solubilizing and neutralization time of approximately 2.5 to 3.0 hours. Insoluble clump formations of the casein powder occur in water above 100° F. or in a solution that is too rapidly heated above the same temperature. Thus, the ageing and the neutralization of casein is a temperature-dependent reaction requiring gradual heating, specifically during two critical points of the process.

The first critical point involves the addition of casein to the water. Casein placed in solution hydrates extremely fast. The addition of casein to water above 100° F. causes a reduction in surface area and lumping which in turn yields an exothermic product. Furthermore, tryptophan, which is one of casein's amino acids, is damaged if the temperature of the water exceeds 170° F.

The second critical point occurs during neutralization and involves the addition of sodium hydroxide (NaOH) to the solution. The casein to caseinate conversion occurs when sodium hydroxide (NaOH) is added to the solution. If NaOH is added to water above 100° F., the resulting product will be an unneutralized material trapped in a shell. Thus, prior to the present invention, caseins had to be neutralized in water that was initially in the range of 70° F. to 100° F. After the casein was neutralized in this range for about 30 minutes, the temperature of the solution was gradually increased to approximately 160° F.

The Badertscher patent states that the temperature may be as high as approximately 176° F. in continuous operation, although it is preferably in the range from 68° F. to 158° F. However, the dispersion of casein in water above 100° F. without the presence of a solubilizing agent will yield a useless, insoluble clump of casein powder. Thus, in order to reach these high temperatures, the examples of the Badertscher patent employ an initial dispersion of casein at lower temperatures and then a gradual heating of the solution to obtain the higher temperatures.

Hence, not only is the solubilization and neutralization of casein according to the teaching of the Badertscher patent temperature-dependent, but Badertscher also requires a gradual heating process (see example 1, column 5-6; example 2, column 6; example 3, column 6) in order to obtain usable caseinate. Badertscher states the casein suspension must be "left to age" or "wetted out". This phrase means that addition of the solubilizing agent to the suspension may not be made until the casein in powder form is hydrated throughout.

SUMMARY OF THE INVENTION

Accordingly, an object of the present invention is to provide a solution to the present time and cost obstacles involved in the production of caseinate. Specifically, it is an object of the present invention to provide an improved process for the dispersion and neutralization of acid casein in the manufacture of liquid caseinate.

It is also an object of this invention to provide for a processing aid to reduce the casein conversion time required for the production of liquid caseinate.

It is a further object of this invention to provide for an improved process which offers substantial time and cost savings and allows for the conversion of casein to caseinate by the end user.

Thus, prior to the present invention, the conversion of casein to caseinate required a lengthy and costly process that precluded its adoption by the end user. In contrast, the present invention reduces the time required to age and neutralize the acid casein to make conversion of casein to caseinate by the end user feasible.

The present invention achieves the foregoing by a process that ages and neutralizes the acid casein in a solution with an initial temperature of approximately 115° to 170° F. The initial aqueous medium to which the acid casein is added contains my solubilizing agent and is at a temperature of 115° to 170° F.

The present invention circumvents the time and temperature dependency of acid casein conversion by initially adding my solubilizing agent to the aqueous medium. The solubilizing agent is a citrate selected from citric acid and the alkali and alkaline earth metal citrates. The addition of the citrates to the water before adding the acid casein provides a substantially quick and complete ageing of the acid casein. Furthermore, the addition of acid casein to the citrate solution, as opposed to pure water, allows the use of a temperature exceeding 100° F. The citrate causes an immediate increase in the pH of the solution. Subsequent to the acid casein addition to the citrate solution, 1 to 2% of the acid casein dissolves and actually begins to neutralize before the addition of the neutralizing agent (NaOH).

The addition of citrates at this beginning stage of the process appears to have a chelating effect.

The acid casein is added to the citrate solution which is at a temperature in excess of 100° F. and less than 170° F. The temperature is maintained and the acid casein allowed to age for up to 10 minutes. Hence, the ageing of the casein only requires up to 10 minutes, as opposed to 30 minutes in the prior art, and the neutralization of the casein decreases from the prior art's range of 2 and ½ to 3 hours to less than 30 minutes.

The preferred process for producing liquid or powdered caseinate comprises the steps of: (i) providing an aqueous medium at a temperature in the range of from about 120° F. to about 165° F.; (ii) adding an alkali or alkaline earth metal citrate to the aqueous medium at approximately the same temperature; (iii) adding the powdered acid casein to the citrate solution, and suspending and ageing the acid casein in the aqueous citrate medium for about 0 to 10 minutes, preferably for one minute; (iv) adding a neutralizing agent to the aqueous medium at approximately the same temperature and neutralizing the solution for about 1 to 30 minutes, preferably for 8 minutes; and (v) if desired, drying the neutralized solution to prepare a powdered caseinate. The caseinate liquid after step (iv) is a stable suspension having an opacity between those of milk and water.

Acid casein is a commercial product, and various acid caseins that are used are New Zealand Lactic Casein, Lot #A3014 (30 mesh); New Zealand Lactic Casein, Lot #6736 (80 mesh); Australian Hydrochloric Casein, Lot #ASD113-124 (30 mesh), or Irish Hydrochloric Casein, Lot #AC1 (30 mesh). All of the aforementioned caseins may be purchased with different particle sizes (mesh sizes). These acid caseins are for illustrative purposes only, and are not intended to limit my invention thereto.

The smallest particle size of acid casein should be used when possible. A smaller particle size decreases the time required to neutralize the acid casein. Preferably the acid casein has been size-reduced into particles of constant and appropriate grain size (i.e., 80 mesh or smaller).

A 30 mesh ground acid casein usually requires approximately 8 minutes for neutralization. An 80 mesh ground acid casein will usually neutralize in approximately 3 minutes. Thus, the preferred acid casein would be 80 mesh or smaller.

The temperature of the water generally ranges from about 115° to 170° F. with the preferred temperature being about 120° to 165° F.

The pH of the water is generally above 7 and as high as 9. The pH of the water is dependent on the locale. Various communities have water of different pH's. The preferred water pH is approximately 7.5.

The solubilizing agent is an alkali or alkaline earth metal citrate. The preferred group of citrates is potassium, sodium, calcium, or magnesium citrate, and mixtures thereof. Potassium citrate is the most preferred. The citrate is added to the water and in the range of 1.2 to 8 parts by weight of citrate to 100 parts by weight of the acid casein powder, except that potassium citrate may be added to the solution in smaller amounts. The preferred range is 1.2 to 5.6 parts by weight potassium citrate to 100 parts by weight acid casein. The use of smaller amounts of potassium citrate, i.e., less than about 1.5 grams, generally increases the time required to age the acid casein. Furthermore, the use of less potassium citrate causes the acid casein slurry to require more agitation to keep the casein suspended before the addition of the sodium hydroxide to effectuate the acid casein neutralization.

The potassium citrate solution has a pH range from about 8.0 to about 8.5. The citrate is allowed to dissolve; this normally takes 10 to 30 seconds. On a commercial basis the citrate will be added over a period of 1 to 3 minutes, preferably 1.5 to 2.5 minutes. Then, the solution is allowed to stand for a period of 0.5 to 2 minutes, preferrably 0.5 to 1.5 minutes before adding the casein.

In the preferred embodiment, potassium citrate is used because it accepts the acid casein readily and causes the wetting out (ageing) of the acid casein to be almost instantaneous. Calcium citrate is the least preferred citrate to use because of its solubility.

Next, acid casein is added to the citrate solution. The acid casein used may be of the type that is soluble in lactic, hydrochloric, or sulfuric acid.

The time required for the acid casein addition depends on the quantity being added. The addition should be as quick as possible and generally takes between 10 seconds and 5 minutes. The preferred range is from about 15 to 90 seconds. On a commercial basis we contemplate using a suspension of acid casein and adding the acid casein suspension for about 2 to 4 minutes. The time required for ageing (wetting) the acid casein ranges from zero (0) to 10 minutes and preferrably takes place in about 10 to 90 seconds. The solution is agitated during the ageing (wetting out) process.

Sufficient sodium hydroxide is then added to the acid casein slurry to effectuate neutralization. Alternatively, hydroxides of calcium or potassium, and mixtures thereof, may be used, i.e., NaCaOH may be added in place of NaOH. The neutralization usually takes between 2 and 30 minutes, with less time being required when the smaller size of acid casein is used. The preferred neutralization time is from 2 minutes to 10 minutes. When 80 mesh acid casein is used the preferred neutralization occurs between 2 to 4 minutes.

The viscosity of the caseinate liquid decreases with time.

The result of my process is a ready-to-use liquid caseinate. If powdered caseinate is desired, the liquid caseinate is converted to powder by drying.

The following examples illustrate my invention:

EXAMPLE I 6.1 grams of potassium citrate is added to 800 grams of water. The water is at a temperature of 140° F. and has a pH of approximately 7.48. After adding the citrate, the pH of the potassium citrate solution is 8.25. The time required to dissolve the citrate is about 15 seconds. 125 grams of New Zealand lactic casein (80 mesh) is added over a period of about 45 seconds. The casein is aged and agitated for 15 seconds. 12 mls. of sodium hydroxide is added to the casein slurry. The casein is neutralized for 3 minutes. The caseinate liquid had the following properties:

|  | 5 minutes | 10 minutes | 15 minutes |
|---|---|---|---|
| viscosity | 35 c.p.s. | 30 c.p.s. | 29 c.p.s. |
| temperature | 140° F. | 142° F. | 144° F. |
| pH | 6.61 | 6.60 | 6.60 |

EXAMPLE II

The procedure is as in Example I, the operating parameters being as follows:
- amount of water: 800 grams
- amount of acid casein: 125 grams
- type of acid casein: New Zealand lactic casein—30 mesh
- initial water temperature and pH: 122° F.; pH 7.62
- quantity of potassium citrate: 6.1 grams
- time to dissolve citrate: about 15 seconds
- pH of citrate solution: 8.30
- time for acid casein addition: about 30 seconds
- time for ageing acid casein: about 90 seconds
- amount of 20% sodium hydroxide: 12 mls.
- time to neutralize casein: about 12 minutes The caseinate liquid had the following properties:

|  | 5 minutes | 10 minutes | 15 minutes |
|---|---|---|---|
| viscosity | 35 c.p.s. | 52 c.p.s. | 52 c.p.s. |
| temperature | 121° F. | 122° F. | 122° F. |
| pH | 6.74 | 6.62 | 6.61 |

EXAMPLE III

The procedure of Example I is repeated with the operating parameters being as follows:
- amount of water: 800 grams
- amount of acid casein: 125 grams
- type of acid casein: New Zealand lactic casein—30 mesh
- initial water temperature and pH: 140° F.; pH 7.57
- quantity of potassium citrate: 6.1 grams
- time required to dissolve citrate: about 15 seconds
- pH of citrate solution: 8.27
- time for acid casein addition: about 30 seconds
- time for ageing acid casein: about 30 seconds
- amount of 20% sodium hydroxide: 12 mls.
- time to neutralize casein: about 8 minutes The caseinate liquid had the following properties:

|  | 5 minutes | 10 minutes | 15 minutes |
|---|---|---|---|
| viscosity | 27 c.p.s. | 27 c.p.s. | 26 c.p.s. |
| temperature | 142° F. | 144° F. | 145° F. |
| pH | 6.66 | 6.63 | 6.62 |

EXAMPLE IV

The procedure of Example I is repeated with the operating parameters being as follows:
- amount of water: 800 grams
- amount of acid casein: 125 grams
- type of acid casein: New Zealand lactic casein—30 mesh
- initial water temperature and pH: 165° F.; pH 7.64
- quantity of potassium citrate: 6.1 grams
- time to dissolve citrate: about 15 seconds
- pH of citrate solution: 8.23
- time for acid casein addition: about 30 seconds
- time for ageing acid casein: about 30 seconds
- amount of 20% sodium hydroxide: 12 mls.
- time required to neutralize casein: about 7 minutes The caseinate liquid had the following properties:

|  | 5 minutes | 10 minutes | 15 minutes |
|---|---|---|---|
| viscosity | 18 c.p.s. | 18 c.p.s. | 18 c.p.s. |
| temperature | 160° F. | 161° F. | 162° F. |
| pH | 6.59 | 6.58 | 6.58 |

EXAMPLE V

The procedure of Example I is repeated with the operating parameters being as follows:
- amount of water: 800 grams
- amount of acid casein: 125 grams
- type of acid casein: Australian hydrochloric casein—30 mesh
- initial water temperature and pH: 120° F.; pH 7.55
- quantity of potassium citrate: 6.1 grams
- time to dissolve citrate: about 15 seconds
- pH of citrate solution: 8.25
- time for acid casein addition: about 15 seconds
- time for ageing acid casein: about 45 seconds
- amount of 20% sodium hydroxide: 12 mls.
- time required to neutralize casein: about 8 minutes The caseinate liquid had the following properties:

|  | 5 minutes | 10 minutes | 15 minutes |
|---|---|---|---|
| viscosity | 47 c.p.s. | 53 c.p.s. | 51 c.p.s. |
| temperature | 123° F. | 125° F. | 127° F. |
| pH | 6.68 | 6.58 | 6.57 |

EXAMPLE VI

The procedure of Example I is repeated with the operating parameters being as follows:
- amount of water: 800 grams
- amount of acid casein: 125 grams
- type of acid casein: Australian hydrochloric casein—30 mesh
- initial water temperature and pH: 140° F.; pH 7.56
- quantity of potassium citrate: 6.1 grams
- time to dissolve citrate: about 15 seconds
- pH of citrate solution: 8.27
- time for acid casein addition: about 15 seconds
- time for ageing acid casein: about 30 seconds
- amount of 20% sodium hydroxide: 12 mls.
- time required to neutralize casein: about 7 minutes The caseinate liquid had the following properties:

|  | 5 minutes | 10 minutes | 15 minutes |
|---|---|---|---|
| viscosity | 36 c.p.s. | 32 c.p.s. | 30 c.p.s. |
| temperature | 140° F. | 142° F. | 144° F. |
| pH | 6.58 | 6.53 | 6.53 |

EXAMPLE VII

The procedure of Example I is repeated with the operating parameters being as follows:
- amount of water: 800 grams
- amount of acid casein: 125 grams
- type of acid casein: Australian hydrochloric casein—30 mesh
- initial water temperature and pH: 130° F.; pH 7.61
- quantity of potassium citrate: 6.1 grams
- time to dissolve citrate: about 15 seconds
- pH of citrate solution: 8.24
- time for acid casein addition: about 15 seconds time for ageing acid casein: about 1 minute
amount of 20% sodium hydroxide: 12 mls.
time required to neutralize casein: about 6 minutes
The caseinate liquid had the following properties:

|  | 5 minutes | 10 minutes | 15 minutes |
|---|---|---|---|
| viscosity | 21 c.p.s. | 18 c.p.s. | 16 c.p.s. |
| temperature | 161° F. | 165° F. | 168° F. |
| pH | 6.51 | 6.47 | 6.46 |

EXAMPLE VIII

The procedure of Example I is repeated with the operating parameters being as follows:
amount of water: 800 grams
amount of acid casein: 125 grams
type of acid casein: Irish hydrochloric casein—30 mesh
initial water temperature and pH: 120° F.; pH 7.49
quantity of potassium citrate: 6.1 grams
time to dissolve citrate: about 15 seconds
pH of citrate solution: 8.34
time for acid casein addition: about 30 seconds
time for ageing acid casein: about 30 seconds
amount of 20% sodium hydroxide: 12 mls.
time required to neutralize casein: about 8 minutes
The caseinate liquid had the following properties:

|  | 5 minutes | 10 minutes | 15 minutes |
|---|---|---|---|
| viscosity | 39 c.p.s. | 41 c.p.s. | 41 c.p.s. |
| temperature | 125° F. | 125° F. | 125° F. |
| pH | 6.80 | 6.73 | 6.71 |

EXAMPLE IX

The procedure of Example I is repeated with the operating parameters being as follows:
amount of water: 800 grams
amount of acid casein: 125 grams
type of acid casein: Irish hydrochloric casein—30 mesh
initial water temperature and pH: 140° F.; pH 7.54
quantity of potassium citrate: 6.1 grams
time to dissolve citrate: about 15 seconds
pH of citrate solution: 8.32
time for acid casein addition: about 15 seconds
time for ageing acid casein: about 30 seconds
amount of 20% sodium hydroxide: 12 mls.
time required to neutralize casein: about 7 minutes
The caseinate liquid had the following properties:

|  | 5 minutes | 10 minutes | 15 minutes |
|---|---|---|---|
| viscosity | 26 c.p.s. | 23 c.p.s. | 22 c.p.s. |
| temperature | 145° F. | 149° F. | 150° F. |
| pH | 6.66 | 6.64 | 6.63 |

EXAMPLE X

The procedure of Example I is repeated with the operating parameters being as follows:
amount of water: 800 grams
amount of acid casein: 125 grams
type of acid casein: Irish hydrochloric casein—30 mesh
initial water temperature and pH: 160° F.; pH 7.67
quantity of potassium citrate: 6.1 grams
time to dissolve citrate: about 15 seconds
pH of citrate solution: 8.26
time for acid casein addition: about 15 seconds
time for ageing acid casein: about 15 seconds
amount of 20% sodium hydroxide: 12 mls.
time required to neutralize casein: about 5 minutes
The caseinate liquid had the following properties:

|  | 5 minutes | 10 minutes | 15 minutes |
|---|---|---|---|
| viscosity | 22 c.p.s. | 17 c.p.s. | 16 c.p.s. |
| temperature | 158° F. | 162° F. | 165° F. |
| pH | 6.54 | 6.53 | 6.53 |

EXAMPLE XI

The procedure of Example I is repeated with the operating parameters being as follows:
amount of water: 800 grams
amount of acid casein: 125 grams
type of acid casein: New Zealand lactic casein—80 mesh
initial water temperature and pH: 121° F.; pH 7.62
quantity of potassium citrate: 6.1 grams
time to dissolve citrate: about 15 seconds
pH citrate solution: 8.36
time for acid casein addition: about 1 minute
time for ageing acid casein: about 0 seconds
amount of 20% sodium hydroxide: 12 mls.
time required to neutralize casein: about 4 minutes
The caseinate liquid had the following properties:

|  | 5 minutes | 10 minutes | 15 minutes |
|---|---|---|---|
| viscosity | 75 c.p.s. | 63 c.p.s. | 58 c.p.s. |
| temperature | 121° F. | 122° F. | 123° F. |
| pH | 6.66 | 6.65 | 6.64 |

In the following Examples XII through XVIII, the time to dissolve the potassium citrate was not specifically measured. The time was approximately the same as the previous examples.

EXAMPLE XII

The procedure of Example I is repeated with the operating parameters being as follows:
amount of water: 800 grams
amount of acid casein: 125 grams
type of acid casein: New Zealand lactic casein—80 mesh
initial water temperature and pH: 160° F.; pH 7.54
quantity of potassium citrate: 6.1 grams
pH of citrate solution: 8.26
time for acid casein addition: about 30 seconds
time for ageing acid casein: about 30 seconds
amount of 20% sodium hydroxide: 12 mls.
time required to neutralize casein: about 3 minutes
The caseinate liquid had the following properties:

|  | 5 minutes | 10 minutes | 15 minutes |
|---|---|---|---|
| viscosity | 22 c.p.s. | 17 c.p.s. | 12 c.p.s. |
| temperature | 160° F. | 162° F. | 162° F. |
| pH | 6.54 | 6.54 | 6.55 |

EXAMPLE XIII

The procedure of Example I is repeated with the operating parameters being as follows:
  amount of water: 800 grams
  amount of acid casein: 125 grams
  type of acid casein: New Zealand lactic casein—30 mesh
  initial water temperature and pH: 140° F.; pH 7.64
  quantity of potassium citrate: 3 grams
  pH of citrate solution: 8.20
  time for acid casein addition: about 15 seconds
  time for ageing acid casein: about 30 seconds
  amount of 20% sodium hydroxide: 12 mls.
  time required to neutralize casein: about 8 minutes
The caseinate liquid had the following properties:

|  | 5 minutes | 10 minutes | 15 minutes |
|---|---|---|---|
| viscosity | 33 c.p.s. | 31 c.p.s. | 31 c.p.s. |
| temperature | 138° F. | 140° F. | 140° F. |
| pH | 6.75 | 6.68 | 6.68 |

EXAMPLE XIV

The procedure of Example I is repeated with the operating parmeters being as follows:
  amount of water: 800 grams
  amount of acid casein: 125 grams
  type of acid casein: Australian hydrochloric casein—30/40 mesh
  initial water temperature and pH: 148° F.; pH 7.45
  quantity of potassium citrate: 3 grams
  pH of citrate solution: 8.13
  time for acid casein addition: about 15 seconds
  time for ageing acid casein: about 30 seconds
  amount of 20% sodium hydroxide: 12 mls.
  time required to neutralize acid casein: about 7 minutes
The caseinate liquid had the following properties:

|  | 5 minutes | 10 minutes | 15 minutes |
|---|---|---|---|
| viscosity | 27 c.p.s. | 24 c.p.s. | 26 c.p.s. |
| temperature | 154° F. | 156° F. | 155° F. |
| pH | 6.53 | 6.48 | 6.48 |

EXAMPLE XV

The procedure of Example I is repeated with the operating parameters being as follows:
  amount of water: 800 grams
  amount of acid casein: 125 grams
  type of acid casein: Irish hydrochloric casein—multi-mesh
  initial water temperature and pH: 140° F.; pH 7.48
  quantity of potassium citrate: 3 grams
  pH of citrate solution: 8.17
  time for acid casein addition: about 18 seconds
  time for ageing acid casein: about 15 seconds
  amount of 20% sodium hydroxide: 12 mls.
  time required to neutralize casein: about 7 minutes
The caseinate liquid had the following properties:

|  | 5 minutes | 10 minutes | 15 minutes |
|---|---|---|---|
| viscosity | 29 c.p.s. | 26 c.p.s. | 27 c.p.s. |
| temperature | 143° F. | 143° F. | 142° F. |
| pH | 6.66 | 6.63 | 6.63 |

EXAMPLE XVI

The procedure of Example I is repeated with the operating parameters being as follows:
  amount of water: 800 grams
  amount of acid casein: 125 grams
  type of acid casein: New Zealand lactic casein—80 mesh
  initial water temperature and pH: 140° F.; pH 7.57
  quantity of potassium citrate: 3 grams
  pH of citrate solution: 8.17
  time for acid casein addition: about 36 seconds
  time for ageing acid casein: about 18 seconds
  amount of 20% sodium hydroxide: 12 mls.
  time to neutralize casein: about 3 minutes
The caseinate liquid had the following properties:

|  | 5 minutes | 10 minutes | 15 minutes |
|---|---|---|---|
| viscosity | 37 c.p.s. | 33 c.p.s. | 33 c.p.s. |
| temperature | 142° F. | 143° F. | 142° F. |
| pH | 6.54 | 6.53 | 6.55 |

Before the sodium hydroxide addition, this casein slurry requires more agitation than others (to keep casein suspended). After the addition of sodium hydroxide, the slurry needs much less agitation.

EXAMPLE XVII

The procedure of Example I is repeated with the operating parameters being as follows:
  amount of water: 800 grams
  amount of acid casein: 125 grams
  type of acid casein: New Zealand lactic casein—30 mesh
  initial water temperature and pH: 140° F.; pH 7.49
  quantity of potassium citrate: 1.5 grams
  pH of citrate solution: 8.01
  time for acid casein addition: about 18 seconds
  time for ageing acid casein: about 30 seconds
  amount of 20% sodium hydroxide: 12 mls.
  time required to neutralize casein: about 8 minutes
The caseinate liquid had the following properties:

|  | 5 minutes | 10 minutes | 15 minutes |
|---|---|---|---|
| viscosity | 32 c.p.s. | 33 c.p.s. | 32 c.p.s. |
| temperature | 142° F. | 142° F. | 142° F. |
| pH | 6.73 | 6.70 | 6.71 |

The casein went into the water well but began to fall out. Agitation had to be increased to keep the casein in suspension.

EXAMPLE XVIII

The procedure of Example I is repeated with the operating parameters being as follows:
  amount of water: 800 grams
  amount of acid casein: 125 grams
  type of acid casein: Australian hydrochloric casein—30/40 mesh
  initial water temperature and pH: 140° F.; pH 7.52
  quantity of potassium citrate: 1.5 grams time for acid casein addition: about 15 seconds
time for ageing acid casein: about 30 seconds
amount of 20% sodium hydroxide: 12 mls.
time required to neutralize casein: about 7 minutes

|  | 5 minutes | 10 minutes | 15 minutes |
| --- | --- | --- | --- |
| viscosity | 30 c.p.s. | 32 c.p.s. | 32 c.p.s. |
| temperature | 143° F. | 145° F. | 145° F. |
| pH | 6.71 | 6.56 | 6.55 |

Agitation had to be increased to attempt to keep the casein in suspension. The stir plate agitator was not capable of keeping casein in suspension once it was wetted. Hand agitation had to be applied to suspend casein and incorporate it with the 20% sodium hydroxide solution. The sodium hydroxide then made it possible for the stir plate agitator to work properly.

It will be appreciated that the present invention provides a significant improvement in the process for the dispersion and neutralization of acid caseins in the manufacture of liquid and powdered caseinate. The present method expedites the ageing and neutralization of acid casein.

Although the above examples were done on a laboratory basis, for a commercial process the quantities need only be increased. On a large scale, the preferred process would be complete in 11 to 22 minutes. The alkali metal citrate is added to the water over a period of 1.5 to 2.5 minutes and allowed to stand for 0.5 to 1.5 minutes. Then a suspension of the acid casein is added over a period of 2 to 4 minutes and allowed to age for 0.75 to 1.25 minutes. The sodium hydroxide is added in approximately 0.5 to 2 minutes and allowed to neutralize for 6 to 10 minutes. After neutralization the process is complete.

The foregoing description is for purposes of illustration rather than limitation of the scope of protection accorded this invention. The latter is to be measured by the following claims, which should be interpreted as broadly as the invention permits.

The invention claimed is:

1. A process for preparing caseinate from an acid casein comprising:
   (a) providing an aqueous medium having a pH of between 7 and 8, and heating and maintaining said aqueous medium at a temperature of about 115° to about 170° F.;
   (b) providing a solubilizing agent selected from the group consisting of alkali and alkaline metal citrates and mixtures thereof;
   (c) adding said solubilizing agent to said aqueous medium and maintaining the temperature thereof in the range of about 115° to about 170° F.;
   (d) agitating the aqueous medium containing said solubilizing agent, adding acid casein to said agitated medium and permitting the acid casein to age from about 10 to about 120 seconds;
   (e) adding a neutralizing agent to said aged acid casein aqueous medium and neutralizing said aged acid casein aqueous medium for about 2 to about 30 minutes; and
   (f) recovering the desired liquid or powdered caseinate.

2. The process of claim 1 wherein in step (d) the acid casein is aged from about 10 to about 60 seconds, in step (d) the aged acid casein aqueous medium is neutralized from about 2 to about 10 minutes, and in steps (a) and (c) the temperatures are in the range of about 120° to about 165° F.

3. The process of claim 2 wherein the neutralizing agent is sodium hydroxide and the solubilizing agent is potassium citrate and the amount of citrate is from about 1.2 to about 8 parts by weight of citrate to 100 parts by weight of acid casein.

4. The process of claim 1 wherein the amount of citrate is from about 1.2 to about 5.6 parts by weight citrate to 100 parts by weight of acid casein.

5. The process of claim 1 comprising adding an alkali citrate over a period of about 1.5 to about 2.5 minutes, allowing the water alkali citrate solution to stand about 0.5 to about 1.5 minutes, adding a suspension of acid casein to said water citrate solution over a period of about 2 to about 4 minutes, allowing in step (d) the acid casein to age for about 0.75 to about 1.25 minutes, in step (d) adding a sodium hydroxide solution over a period of about 0.5 to about 2 minutes and then neutralizing for about 6 to about 10 minutes.

6. A process for the preparation of caseinate from acid casein comprising: (a) providing an aqueous medium; (b) adding a solubilizing agent to said aqueous medium selected from the group consisting of alkali metal citrate, alkaline metal citrate, and mixtures thereof, at a temperature in the range of about 115 to about 170 degrees Farenheit; (c) suspending said acid casein in said aqueous medium containing said solubilizing agent; and (d) adding a neutralizing agent to said aqueous medium selected from the group consisting of hydroxides of sodium, calcium, potassium, and mixtures thereof.

7. The process according to claim 6, wherein said aqueous medium is
water.

8. The process according to claim 6, wherein said citrate is selected
from the group consisting of citrates of potassium, calcium, sodium,
magnesium, and mixtures thereof.

9. The process according to claim 6, wherein said aqueous medium is maintained at a temperature in the range from about 120 to about 165 degree Farenheit at the time when said solubilizing agent is added thereto.

10. The process according to claim 6, wherein said casein is left to age for a period of from about 0 to about 10 minutes in the aqueous medium containing a solubilizing agent.

11. The process according to claim 6, wherein said casein is left to age for a period of from about 10 to about 60 seconds.

12. The process according to claim 6, wherein said aqueous medium is maintained at a temperature of about 120 to about 165 degrees Farenheit, and said neutralizing agent is at a temperature in the range from about 120 to about 165 degrees Fahrenheit when added thereto, and the citrate is added in an amount of about 1.2 to about 5.6 parts by weight per 100 parts by weight of acid casein.

13. The process according to claim 6, wherein said neutralizing agent requires from about 2 to about 30 minutes to neutralize said medium.

14. The process according to claim 6, wherein said neutralizing agent requires from about 2 to about 4 minutes to neutralize said medium.

15. The process according to claim 6, wherein said caseinate obtained is a ready-to-use liquid.

* * * * *